(12) United States Patent
Kuwayama et al.

(10) Patent No.: US 6,517,062 B2
(45) Date of Patent: *Feb. 11, 2003

(54) VIBRATION ISOLATOR

(75) Inventors: Naohito Kuwayama, Nagoya (JP); Noboru Arakawa, Nagoya (JP)

(73) Assignee: Tokai Rubber Industries, Ltd., Komaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/520,221

(22) Filed: Mar. 7, 2000

(65) Prior Publication Data

US 2002/0053763 A1 May 9, 2002

(30) Foreign Application Priority Data

Mar. 8, 1999 (JP) .............................. 11-059692
Jan. 11, 2000 (JP) ....................... 2000-003051

(51) Int. Cl.⁷ .............................. F16F 9/00; F16M 1/00
(52) U.S. Cl. ................................ 267/140.12; 267/141.2
(58) Field of Search ....................... 267/140.11, 140.12, 267/140.2, 140.3, 140.5, 141, 141.1, 141.2, 141.3, 141.5, 219, 220, 136

(56) References Cited

U.S. PATENT DOCUMENTS

| | | | |
|---|---|---|---|
| 2,749,160 A | * 6/1956 | Cowles ...................... 287/85 |
| 4,139,246 A | * 2/1979 | Mikoshiba et al. ........... 308/26 |
| 4,270,779 A | * 6/1981 | Watts ......................... 292/175 |
| 4,272,064 A | * 6/1981 | Katumori et al. ......... 267/64 R |
| 4,761,925 A | * 8/1988 | Fukahori et al. ............... 52/167 |
| 4,859,148 A | * 8/1989 | Hibyan .................. 416/134 A |
| 4,998,345 A | * 3/1991 | Funahashi et al. ......... 29/897.2 |
| 5,503,376 A | * 4/1996 | Simuttis et al. ............. 267/293 |
| 5,671,909 A | * 9/1997 | Hamada et al. ............. 267/141 |
| 5,690,320 A | * 11/1997 | Kanda ................... 267/140.12 |

FOREIGN PATENT DOCUMENTS

JP 320132 A * 1/1991
JP 5272583 A * 10/1993

* cited by examiner

Primary Examiner—Matthew C. Graham
Assistant Examiner—Melody M. Burch
(74) Attorney, Agent, or Firm—Oblon, Spivak, McClelland, Maier & Neustadt, P.C.

(57) ABSTRACT

A vibration isolator includes an inner cylindrical metal member, an outer cylindrical metal member located outside the inner cylindrical metal member in a radial direction, and a rubber elastic member interposed between the inner and outer cylindrical metal members so as to elastically connect between these metal members, and is supported by a support metal member forced and fixed into an axial hole of the inner cylindrical metal member. The inner cylindrica metal member is coaxially bulged in a radial direction.

7 Claims, 6 Drawing Sheets

VIBRATION ISOLATOR

BACKGROUND OF THE INVENTION

The present invention relates to a vibration isolator which includes an inner cylindrical metal member, an outer cylindrical metal member located outside the inner cylindrical metal member in a radial direction, and a rubber elastic member interposed between the inner and outer cylindrical metal members so as to elastically connect between these metal members, and is supported by a support metal member forced and fixed into an axial hole of the inner cylindrical metal member.

Conventionally, the background art teaches a vibration isolator with a differential mount as shown in FIG. 11 and FIG. 12. This vibration isolator includes: an inner cylindrical metal member 1; a rubber elastic member 2 which is bonded to an outer circumferential surface of the inner cylindrical metal member 1 by vulcanization adhesion and has a cross section of approximately cross shape; an outer cylindrical metal member 3 which is fitted and fixed outside the rubber elastic member 2; and a cantilever support metal member 4 which is forced and fixed into an axial hole of the inner cylindrical metal member 1 and has a bolt part projecting into the outside at its one end side. By forcing the support metal member 4 into the axial hole of the inner cylindrical metal member 1, the support metal member 4 is firmly fixed to the inner cylindrical metal member 1, and its drawing (removing) force is the substantially same as a press-fit force. The outer cylindrical metal member 3 is forced and fixed into a support bracket of a differential gear case (not shown). The bolt part of the support metal member 4 is inserted into a mounting hole of a body sub-frame (not shown), and further, a nut is screwed into the distal end portion of the support metal member 4, and thereby, the support metal member 4 is supported to the body sub-frame like a cantilever support.

In the above vibration isolator, in order to suppress a vibration amplitude to a proper amplitude with respect to an excessive vibration input, as seen from a comparative example shown in FIG. 9 and FIG. 10, a request has been made to attach a stopper member 5 which extends to a vibration input direction at the axial center of the inner cylindrical metal member 1. The stopper member may be made of a resin or metal, and in light of reducing weight of the vibration isolator, a resin-made stopper member is preferred.

However, the force fit of the support metal member into the axial hole of the inner cylindrical metal member is carried out after the stopper member is fixed to the inner cylindrical metal member; for this reason, the inner cylindrical metal member is enlarged in its diameter. As a result, a great pushing pressure is applied to the stopper member. In the case where the resin stopper member is employed, the resin is brittle to a tensile stress; for this reason, a strain applied to the stopper member becomes great by the aforesaid enlargement of the diameter of the inner cylindrical metal member by a force fit operation. As a result, there is a problem that the stopper member is insufficient in its strength and is lack of a durability. Moreover, in the case of using a metallic stopper member which is formed integrally with the inner cylindrical metal member by forging, or formed by forging or the like and is forced into an inner cylindrical metal member, when the support metal member is forced into the inner cylindrical metal member, a portion having no stopper of the inner cylindrical metal member is elastically deformed; on the other hand, a portion having a stopper is plastically deformed because a resistance in force fit becomes great. As described above, there exists a portion which is plastically deformed; for this reason, the drawing force of the support metal member is reduced to about a half of press-fit force. As a result, this is a factor of losing a function of stably supporting the inner cylindrical metal member of the support metal member.

Moreover, as a vibration isolator having the same structure, there is a vibration isolator including a rubber elastic member formed between the inner and outer cylindrical metal members by vulcanization molding. The rubber elastic member is provided with a so-called ring-like hollow recess portion which extends by a predetermined dimension toward an axial direction along the vicinity of an inner wall of the outer cylindrical metal member from both end of the axial direction and over the entire circumferential direction. Likewise, in the vibration isolator, in order to suppress a vibration amplitude to a proper amplitude with respect to an excessive vibration input, a ring-like stopper member extending in a diameter direction is mounted to the inner cylindrical metal member at both end sides of the axial direction; however, in this case, the same problem as above arises by the force fit of the support metal member into the axial hole of the inner cylindrical metal member.

SUMMARY OF THE INVENTION

The present invention has been made to solve the aforesaid problem. It is, therefore, an object of the present invention to provide a vibration isolator which can prevent a damage of a stopper member by a force fit of a support metal member into an axial hole of an inner cylindrical metal member fixing the stopper member at its outer circumferential surface, and can secure a proper drawing force of the support metal member.

In order to achieve the above object, the present invention provides a vibration isolator including: an inner cylindrical metal member formed in a manner that axial one portion of a metallic pipe is coaxially bulged into a radial direction to axial another portion, and one portion is a large-diameter portion whose inner and outer diameters are slightly larger than inner and outer diameters of another portion; a stopper member fixed to an outer peripheral surface of the large-diameter portion and projecting into a radial direction; an outer cylindrical metal member arranged outside the inner cylindrical metal member including the stopper member in a radial direction; and a rubber elastic member interposed between the inner cylindrical metal member and the outer cylindrical metal member so as to connect elastically between inner cylindrical metal member and the outer cylindrical metal member, the vibration isolator being supported by a support metal member forced into an axial hole of the inner cylindrical metal member.

The position locating the large-diameter portion of the inner cylindrical metal member may be an axial intermediate portion. Moreover, the position locating the large-diameter portion may be axial both end side portions. A material for forming the stopper member may be a resin.

By doing so, before the support metal member is forced into the axial hole of the inner cylindrical metal member, axial one portion of the inner cylindrical metal member including a portion locating the stopper member is formed into a large-diameter portion whose inner and outer diameters are slightly larger than inner and outer diameters of another portion. Therefore, when the support metal member is forced into the axial hole of the inner cylindrical metal member, other portion excluding the large-diameter portion of the inner cylindrical metal member are slightly enlarged in its diameter; however, the large-diameter portion receives no influence by the force-fit of the support metal member.

For this reason, in the case where the stopper member is made of a resin, it is possible to secure a reliability without lowering a strength of the stopper member by the force-fit of the support metal member, and further, to maintain a drawing force of the support metal member. Moreover, in the case where the stopper member is made of metal, when the support metal member is forced into the axial hole of the inner cylindrical metal member, only small-diameter portion other than the large-diameter portion of the inner cylindrical metal member is elastically deformed, and the large-diameter portion locating the stopper member receives almost no influence; therefore, a drawing force of the support metal member can be maintained without being lowered.

A stepped portion of the large-diameter portion of the inner cylindrical metal member and other portions thereof is an inclined surface, and thereby, the inner cylindrical metal member is smoothly enlarged in its diameter. Moreover, a force-fit allowance of the support metal member and the inner cylindrical metal member is set to a range from 0.05 to 0.5 mm in a diametrical dimension, and thereby, it is possible to properly secure a drawing force of the support metal member.

DETAILED DESCRIPTION OF THE PREFERRED EMBODIMENT

Figure 1:
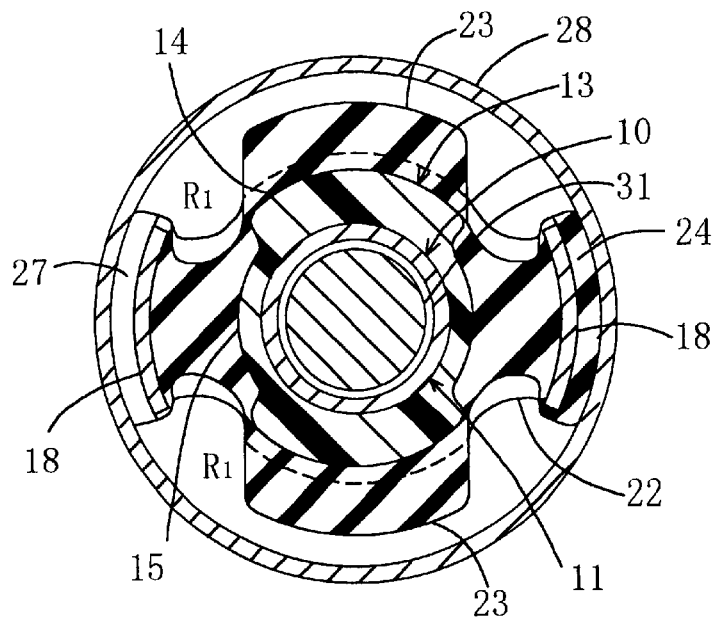
FIG. 1 shows a liquid filled vibration isolator (in a state that a support metal member is forced thereto) according to one embodiment of the present invention, and is a sectional view taken along a line I—I shown in FIG. 2.
Figure 2:
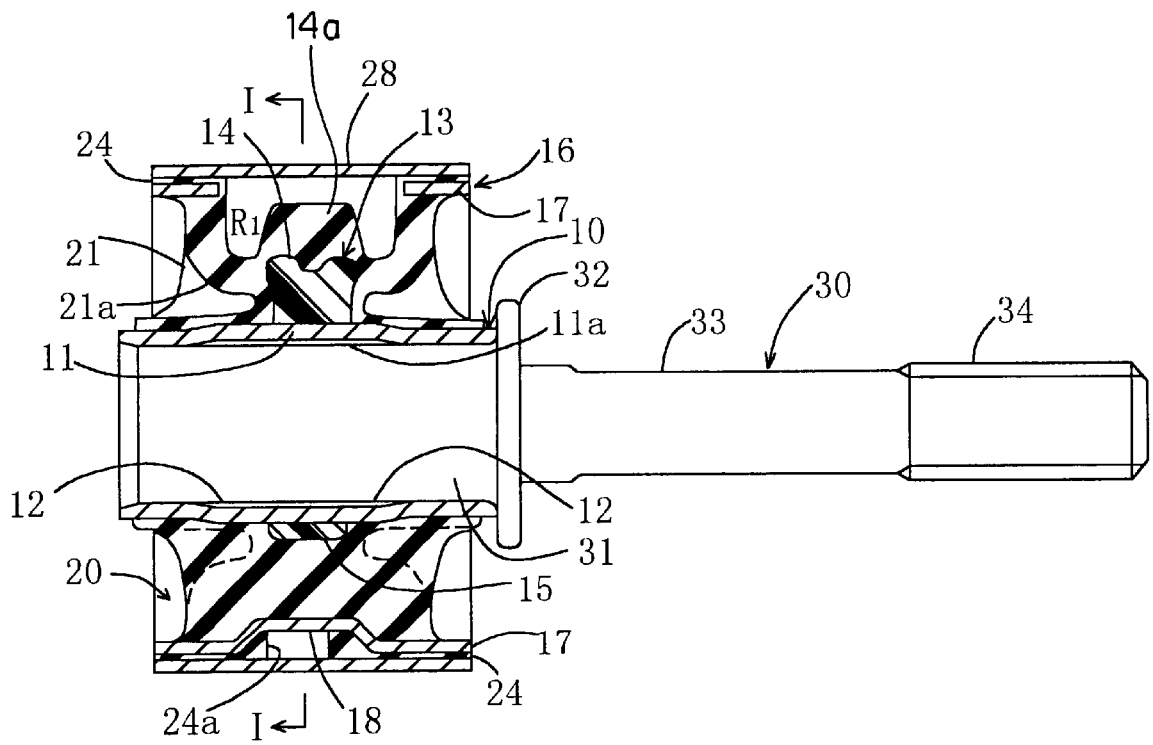
FIG. 2 is a sectional view showing the liquid filled vibration isolator taken along a line II—II shown in FIG. 3.
Figure 3:
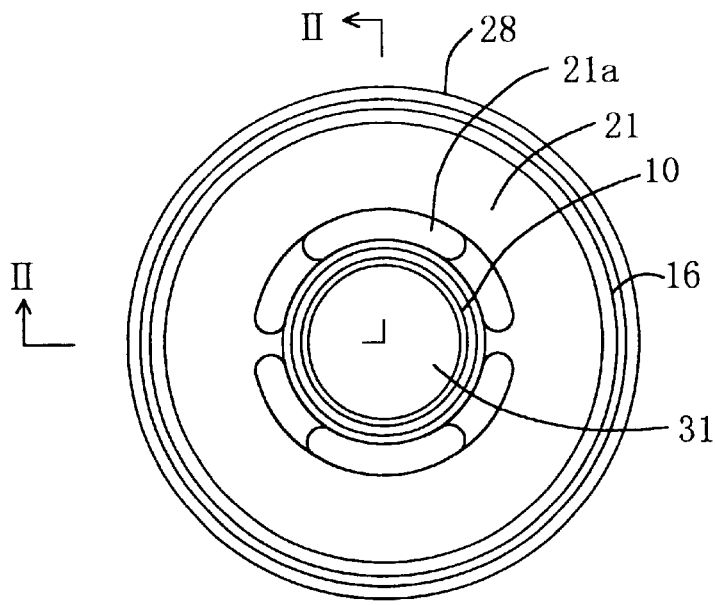
FIG. 3 is a left side view showing the liquid filled vibration isolator.

One embodiment of the present invention will be described below with reference to the accompanying drawings. FIG. 1 to FIG. 3 individually show a liquid filled vibration isolator for a differential mount of a vehicle (in a state that a support metal member is forced thereto) according to one embodiment of the present invention, and FIG. 1 is a sectional view in right angle to the axis, FIG. 2 is a sectional view in an axial direction, and FIG. 3 is a side view.

The liquid filled vibration isolator is provided with an inner cylindrical metal member 10 which is a pipe-like straight member. The inner cylindrical metal member 10 has a large-diameter portion 11 in which an axial intermediate portion is coaxially and slightly bulged to a radial direction. Namely, inner and outer diameters of the large-diameter portion 11 are formed slightly larger than those of other portions thereof. Each boundary between the large-diameter portion 11 and its both end portions is a tilted portion 12;12 where an axially slight portion connects both sides of different diameter. The large-diameter portion 11 is formed by the following bulge forming method (diameter enlarging method) or the like. According to the bulge forming method, both side portions of a pipe-like member, which is not enlarged in its diameter, are held by a fixed jig in a state that its outer circumferential surface is covered, and then, in a state that only intermediate portion to be enlarged is exposed, a high pressure liquid is injected into the pipe so that only intermediate portion is coaxially bulged into the outside in the radial direction by the liquid pressure. The intermediate portion of the large-diameter portion 11 is fixedly provided with a stopper member 13 projecting from diametrical both sides which is a main vibration input direction (vertical direction in figures).

The stopper member 13 is made of a resin, and preferably, is formed of a material which has a high hardness by adding a glass fiber to a polyamide-based resin such as nylon 6-6 by about 15% to 45%. As shown in FIG. 1, the stopper member 13 has a shape of cross section in right angle to the axis which is symmetrical in its up and down and in its right and left in FIG. 1. Further, in the stopper member 13, each of the up and down portions is a thick wall portion 14;14 of substantially ¼ circular ring shape, and each of the right and left portions is a thin wall portion 15;15 of substantially ¼ circular ring shape. The thick and thin wall portions 14 and 15 are integrally formed so that respective outer periphery are connected like a curve at a boundary portion in the circumferential direction. Moreover, as shown in FIG. 2, the stopper member 13 has a axial section of substantially rectangular shape, which is symmetrical in its up and down and in its right and left in FIG. 2. Further, the stopper member 13 is formed with a groove portion 14a which extends along a circumferential direction at the axial center of the thick wall portion 14;14. The groove portion 14a is formed in order to improve a bond strength of a rubber elastic member 20 which will be described later.

The stopper member 13 is formed on the outer circumferential surface of the inner cylindrical metal member 10 by resin integral molding. Therefore, the stopper member 13 is formed with a high productivity, and is cheaply provided. In this case, the outer circumferential surface of the inner cylindrical metal member 10 locating the stopper member 13 is previously subjected to knurling so that the surface becomes rough, and thereby, it is possible to improve a close adhesion with a resin. However, attachment of the stopper member 13 to the inner cylindrical metal member 10 is not limited to the above-mentioned, a previously molded stopper member 13 may be fitted and fixed into the outer circumferential surface of the large-diameter portion 11 of the inner cylindrical metal member 10. A cylindrical intermediate metal member 16 is coaxially located on the outer peripheral side of the inner cylindrical metal member 10 including the stopper member 13. The inner cylindrical metal member 10 and the stopper member 13 are elastically connected by a rubber elastic member 20 which will be described later.

The intermediate metal member 16 is formed in a manner that a metallic thin plate is subjected to blanking and bending. As shown in FIG. 1 and FIG. 2, the intermediate metal member 16 includes: a pair of ring portions 17 and a pair of long plate-like connecting portions 18. More specifically, the pair of ring portions 17 is coaxially positioned at both sides in the axial direction and has a predetermined width, and the pair of connecting portions 18 is interposed between both ring portions 17 at a position parallel in the axial direction and symmetrical in a radial direction, and integrally connect these both ring portions 17. The pair of connecting portion 18 is slightly reduced in its diameter with respect to the ring portion 17, and partitions between two ring portions 17 so as to form two window portions arranged between the ring portions in the circumferential direction. The intermediate metal member 16 is arranged so that both connecting portions 18 are positioned at both sides in the radial direction perpendicular to a projecting direction of the stopper member 13.

As shown in FIG. 1 and FIG. 2, a rubber elastic member 20 includes a pair of side wall portions 21;21 and a pair of arm portions 22;22. More specifically, the pair of side wall portion 21 is a thick wall connecting between the ring portion 17 and the inner cylindrical metal member 10 over the entire circumference in the vertical direction, and the pair of arm portion 22 is a flat plate which extends in the axial direction between the pair of side wall portions and connects between the pair of connecting portions 18 and the inner cylindrical metal member 10. The side wall portion 21;21 has a curved surface such that both outer sides are slightly concave toward the axial direction. Further, as shown in FIG. 2 and FIG. 3, the side wall portion 21;21 is formed with a recess portion 21a;21a which has a semi-circular arc so as to surround the inner cylindrical metal member 10 at a vertically symmetrical position of the curved surface from the curved surface to the vicinity of the stopper member 13. The recess portion 21a;21a has a two-stage depth toward the axial center so that its central portion approaches the stopper member 13 from the circumferential both outer side portions.

Moreover, there is provided a pair of shock absorbing convex portions 23 which extends from the arm portion 22, and is projected into a main vibration input direction so as to cover the thick wall portion 14 of the stopper member 13. The shock absorbing convex portion 23 absorbs an impact when the stopper member 13 collides with an outer cylindrical metal member 28 which will be described later. A thin-wall rubber portion 24 is fixed on each outer surface of the ring portion 17;17 and the connecting portion 18;18. Moreover, the thin-wall rubber portion 24 fixed on one connecting portion 18 is formed with a groove portion 24a which eliminates all rubber portions in the circumferential direction at an intermediate position in the axial direction, and functions as an orifice 27 described later as shown in FIG. 1.

The rubber elastic member 20 is formed by vulcanization molding, and the formation is carried out in the following manner. More specifically, the inner cylindrical metal member 10, on which the stopper member 13 is fixed, and the intermediate metal member 16 are set in a molding die (not shown), and then, in this state, vulcanization molding is carried out, and thereby, the rubber elastic member 20 is integrally molded as a part of a rubber vulcanization molding product (not shown) which is an intermediate product. The rubber vulcanization molding product thus formed is inserted and fixed to an outer cylindrical metal member 28.

The outer cylindrical metal member 28 is a thin-wall and large-diameter metallic pipe, and then is formed as a part of a vibration isolator in the following manner. More specifically, the outer cylindrical metal member 28 is fitted to an outer periphery of the rubber vulcanization molding product via the thin-wall rubber portion 24, and thereafter, is subjected to drawing so as to be fixed to the rubber vulcanization molding product. Whereby a space surrounded by the pair of side wall portions 21 and arm portions 22 is liquid-tightly closed, and thus, a pair of liquid chambers R1 is formed. Moreover, an orifice 27 connecting both liquid chambers R1 is formed between an inner peripheral surface of the outer cylindrical metal member 28 and the groove portion 24a. Water is sealed in the two liquid chambers R1 and the orifice 27 as a liquid. In this case, a method for sealing the water is carried out in the following manner. More specifically, the rubber vulcanization molding product and the outer cylindrical metal member 28 are immersed in a liquid tank filled with water, and in this state, the rubber vulcanization molding product is inserted into the outer cylindrical metal member 28, and further, the outer cylindrical metal member is subjected to drawing. In this case, water is used as a liquid to be sealed; however, the liquid is not limited to water. For example, other incompressible fluid such as alkylene glycol and silicon oil may be sealed. The thin-wall rubber portion 24 may be attached to an inner wall surface of the outer cylindrical metal member 28 in place of being attached to the outer peripheral surface of the intermediate metal member 16.

A support metal member 30 for cantilever support is fitted by force fit into the axial hole of the inner cylindrical metal member 10 of the vibration isolator on which the outer cylindrical metal member 28 is fixed. The support metal member 30 has a fitted portion 31 forced into the axial hole, and a support portion 33 which is coaxially connected to the other end side of the fitted portion 31 via a flange portion 32. The fitted portion 31 has an outer diameter which is slightly larger than a diameter of the axial hole of the inner cylindrical metal member 10, and has a axial length slightly shorter than a length of the inner cylindrical metal member 10. The support portion 33 has a diameter smaller than the fitted portion 31 and an axial length equivalent to a dimension of a body sub-frame into which the support portion is fitted, and is formed with a bolt portion 34 at its distal end side.

The fitted portion 31 of the support metal member 30 is forced into the axial hole of the inner cylindrical metal member 10, and thereby, the inner cylindrical metal member 10 is enlarged in its diameter, and thus, the fitted portion 31 is firmly fitted and fixed into the inner cylindrical metal member 10. In this case, a force-fit allowance (enlarged diameter) on both end sides of the inner cylindrical metal member 10 by the force-fit of the support metal member 30 is set to a range from 0.05 to 0.5 mm. By doing so, the support metal member 30 is firmly fixed to the inner cylindrical metal member 10, and the drawing force becomes the substantially same as a press-fit force. Moreover, in the case of forcing the support metal member 30 into the inner cylindrical metal member 10, a boundary between the large-diameter portion 11 and its both end side portions is a tilted portion 12;12; therefore, it is possible to smoothly enlarge the diameter of the inner cylindrical metal member 10, and to readily perform a force (press) fit work.

The intermediate portion including a portion for arranging the stopper member 13 of the inner cylindrical metal member 10 is formed into a large-diameter portion 11 slightly larger than inner and outer diameters of other portions, and thereby, when the support metal member 30 is forced into the axial hole of the inner cylindrical metal member 10, only other portion excluding the large-diameter portion 11 is elastically deformed by an influence of the press fit, and then, is enlarged in its diameter, and thereby, a clearance 11a is formed between the inner peripheral surface of the large-diameter portion 11 and the outer peripheral surface of the inner cylindrical metal member 10. As a result, the large-diameter portion 11 does not receive any influence by the press fit. More specifically, the resin stopper member 13 does not receive a radial outward force; therefore, without lowering the strength of the stopper member 13, it is possible to secure a reliability of the stopper member 13 for a long period. Moreover, the support metal member 30 receives an elastic reaction force from the inner cylindrical metal member 10; therefore, the drawing force can be properly secured equally to the press-fit force without being lowered.

The liquid filled vibration isolator constructed as described above is fixed in a manner that in a state that the stopper member 13 is vertically positioned, the outer cylindrical metal member 28 is forced into an insertion hole of a differential gear box (not shown). On the other hand, the support portion 33 of the support metal member 30 is inserted into a body sub-frame, and then, a nut is screwed into the bolt portion 34, and thereby, the support metal member 30 is fixed to the body sub-frame while the liquid filled vibration isolator being supported to a vehicle body side by cantilever support.

When a vertical vibration input of the vehicle is applied, the liquid in the liquid chamber R1 flows into the orifice 27, and then, smoothly flows between the two liquid chambers R1 and R1. Thus, a liquid column resonance action in the orifice 27 effectively takes place, so that the vertical vibration input can be damped. When the vertical vibration input becomes great, the stopper member 13 is collided against the inner wall surface of the outer cylindrical metal member 28 via the shock absorbing convex portion 23, and thereby, a vibration amplitude is suppressed; therefore, a vibration damping effect of the vibration isolator can be improved. More specifically, the vibration isolator can damp a vibration by not only a normal vibration (shut noise and so on) input but also by a great vibration (abnormal rub-a-dub noise and so on) input. In this case, as described above, a durability of the stopper member 13 is secured without causing a lowering of strength by the press fit of the support metal member 30 to the inner cylindrical metal member 10; therefore, it is possible to securely suppress a vibration by the aforesaid excessive vibration input for a long period.

The above embodiment has explained about the case where the stopper member is made of a resin. The stopper member may be made of metal. In this case, the inner cylindrical metal member 10 is provided with the large-diameter portion 11; therefore, a small-diameter portion of the inner cylindrical metal member 10 other than the large-diameter portion 11 is elastically deformed by forcing the support metal member 30 into the inner cylindrical metal member 10, and the large-diameter portion 11 receives almost no influence. As described above the small-diameter portion of the inner cylindrical metal member 10 is elastically deformed, and thereby, an elastic reaction force from the inner cylindrical metal member 10 is applied to the support metal member 30. Thus, the drawing force of the support metal member 30 is not reduced; therefore, a supporting function of the support metal member 30 can be secured.

Figure 4:
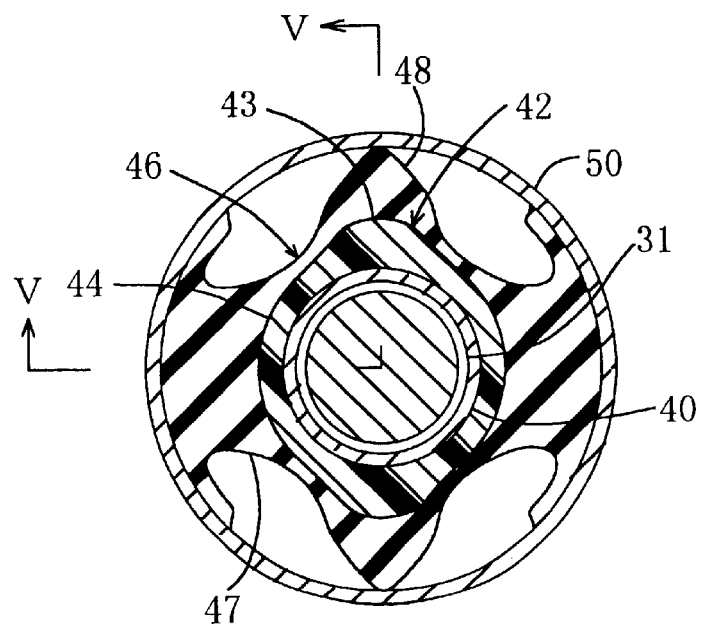
FIG. 4 shows a modification example of the vibration isolator, and is a sectional view taken along a line IV—IV shown in FIG. 5.
Figure 5:
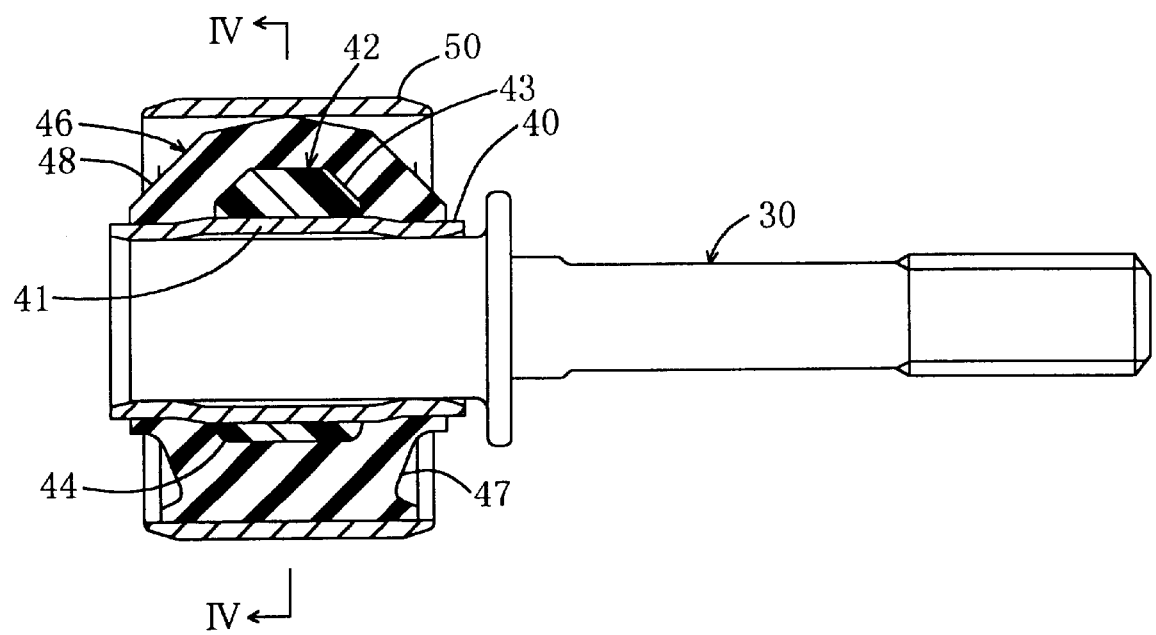
FIG. 5 is a sectional view showing the vibration isolator taken along a line V—V shown in FIG. 4.

Next, referring to FIG. 4 and FIG. 5, the following is a description on a modification example of the above embodiment that is, on the case where the present invention is applied to a vibration isolator which is not a liquid filled type.

An inner cylindrical metal member 40 has the same shape as the above inner cylindrical metal member 10, and a stopper member 42 is fixed to a large-diameter portion 41 of the inner cylindrical metal member 40. The stopper member 42 has a cross section in right angle to the axis of longitudinal elapse ring shape, and its up and down portions are a thick-wall portion 43;43, and its right and left portions are a thin-wall portion 44;44. Further, the stopper member 42 has an axial section of substantially rectangular shape which is symmetrical in the up and down and in the right and left. Both sides of the thick-wall portion 43;43 in the axial direction is formed with a notch portion notched at an angle of 45°.

A rubber elastic member 46 is arranged on an outer peripheral surface of the inner cylindrical metal member 40 including the stopper member 42 so as to elastically connect between the inner cylindrical metal member 40 and an outer cylindrical metal member 50. The rubber elastic member 46 is formed with a pair of plate-like arm portions 47;47 and a shock absorbing convex portion 48;48. More specifically, the arm portion 47 extends toward the axial direction along the inner cylindrical metal member 40 at the thin-wall portion 44;44 side of the stopper member 42 so as to connect between the outer cylindrical metal member 50 and the inner cylindrical metal member 40. The shock absorbing convex portion 48 extends from the arm portion 47;47, and covers the thick-wall portion 43;43 of the stopper member 42, and further, vertically projects so that its distal end contacts with the outer cylindrical metal member 50. The above support metal member 30 is inserted into the inner cylindrical metal member 40 by a force fit.

In the modification example constructed as described above, the same effect as the above embodiment can be obtained.

Next, another embodiment of the present invention will be described below.

Figure 6:
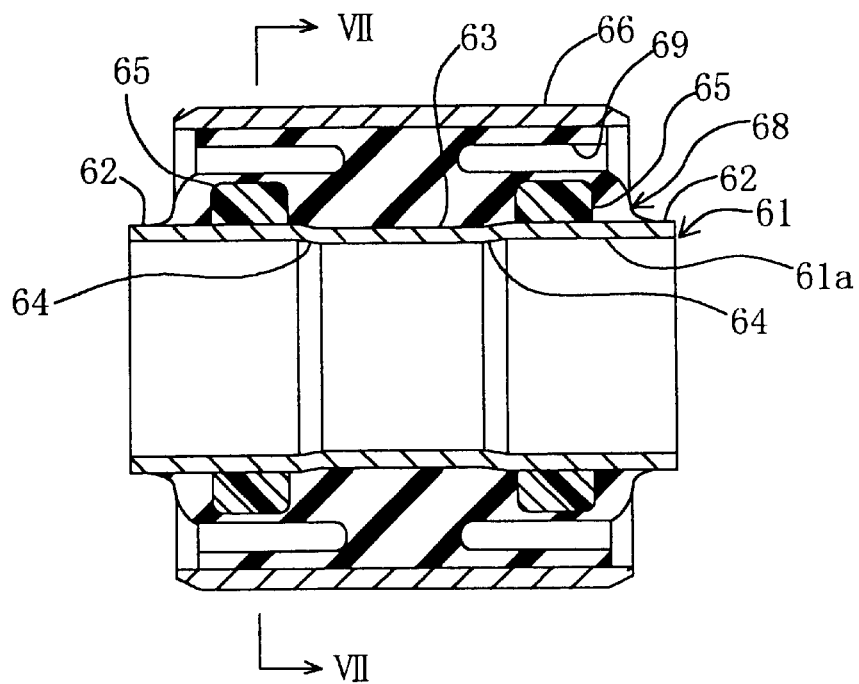
FIG. 6 is an axial sectional view showing a vibration isolator according to another embodiment of the present invention.
Figure 7:
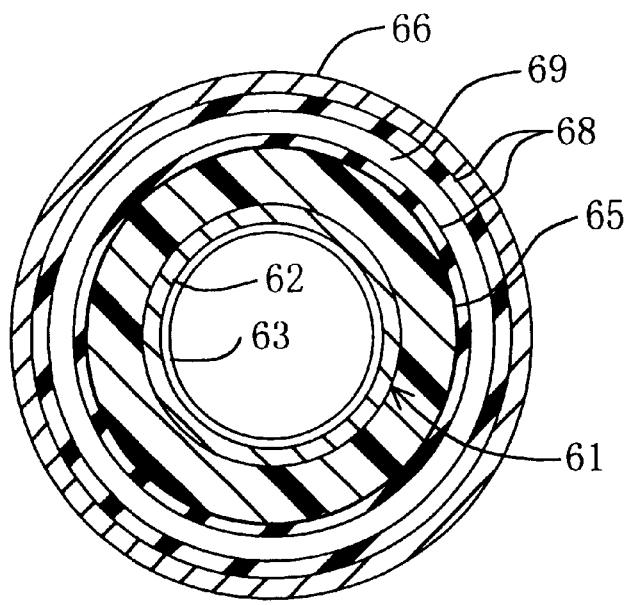
FIG. 7 is a sectional view showing the vibration isolator taken along a line VII—VII shown in FIG. 6.
Figure 8:
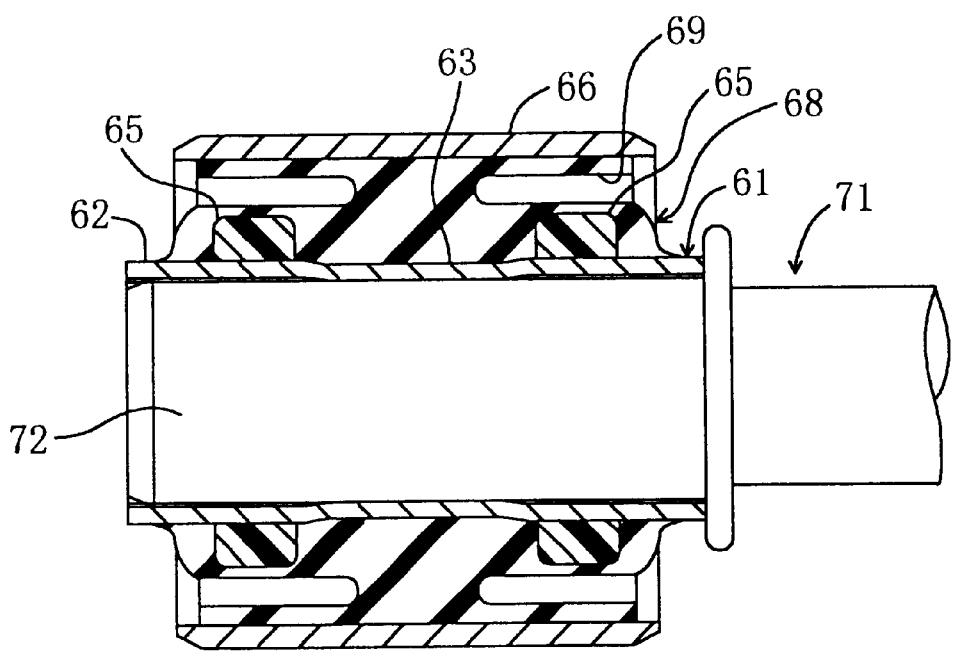
FIG. 8 is a sectional view showing a state that a support metal member is forced into the vibration isolator.
Figure 9:
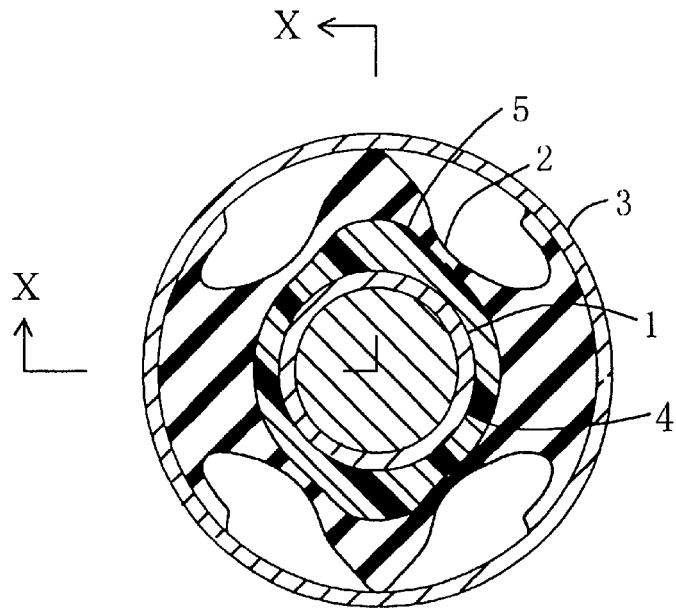
FIG. 9 shows a comparative example of the vibration isolator, and is a sectional view taken along a line IX—IX shown in FIG. 10.
Figure 10:
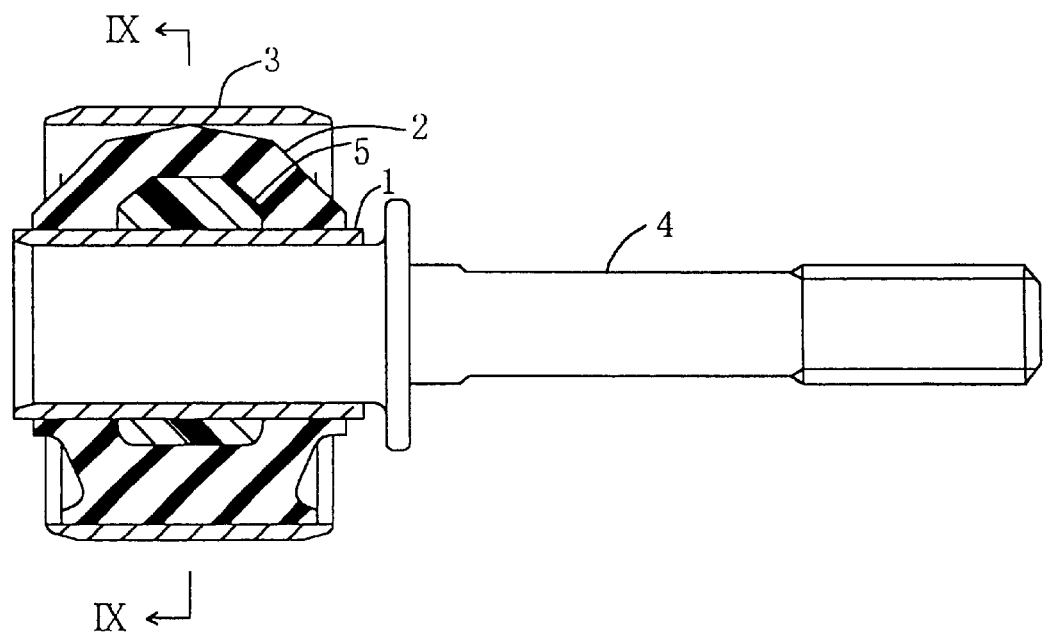
FIG. 10 is a sectional view showing the vibration isolator taken along a line X—X shown in FIG. 9.
Figure 11:
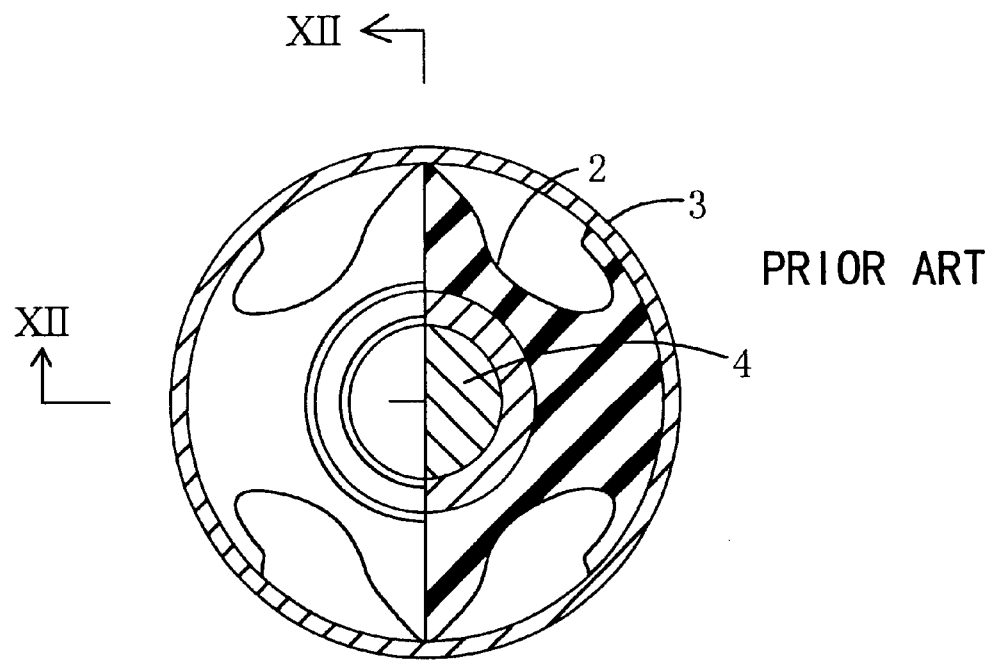
FIG. 11 is a side view partly in section showing a conventional vibration isolator.
Figure 12:
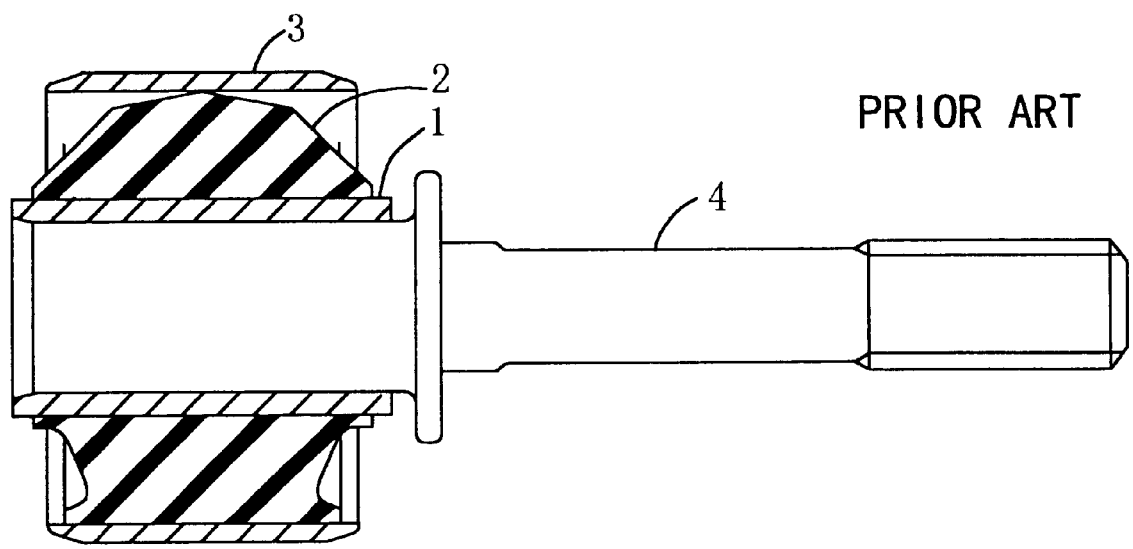
FIG. 12 is a sectional view showing the conventional vibration isolator taken along a line XII—XII shown in FIG. 11.

FIG. 6 and FIG. 7 are an axial sectional view of a vibration isolator of this embodiment and a cross sectional view of the same. FIG. 8 is an axial sectional view showing a state that the support metal member is forced into the vibration isolator.

The vibration isolator is provided with an inner cylindrical metal member 61 which is a pipe-like straight metal member. In the inner cylindrical metal member 61, substantially ⅓ axial portions from both ends are a pair of large-diameter portion 62;62 which are coaxially slightly bulged into a radial direction as compared with a substantially ⅓ intermediate portion. More specifically, inner and outer diameters of the large-diameter portion 62;62 are enlarged slightly more than inner and outer diameters of the intermediate portion 63 held between the large-diameter portions 62;62. In each boundary between the large-diameter portion 62;62 and the intermediate portion 63, its axial slight portion is an inclined portion 64;64 which connects both sides having different diameter. The large-diameter portion 62;62 is formed by a bulge forming method (diameter enlarging method) in the same manner shown in the above embodiment. A resin ring-like stopper member 65;65 is fixed between an axial intermediate position of each large-diameter portion 62;62 and a position near to the intermediate portion 63. The stopper member 65 is projected into a radial direction along the entire circumstance of the outer peripheral surface of the large-diameter portion.

An outer cylindrical metal member 66, which is a thin-wall cylindrical pipe, is coaxially arranged on an outer peripheral side of the inner cylindrical metal member 61 including the stopper member 65;65. A rubber elastic member 68 is integrally formed over the entire circumstance between the outer and inner cylindrical metal members 66 and 61 by vulcanization molding, and elastically connects between both metal members 66 and 61. As shown in FIG. 6 and FIG. 7, the rubber elastic member 68 is formed with a pair of recess portions 69;69. The recess portion 69;69 extends from axial both ends to both end position nearly of the intermediate portion 63 between an inner wall surface of the outer cylindrical metal member 66 and an outer periphery of the stopper member 65;65, and is a ring-like space portion extending over the entire circumferential direction.

As shown in FIG. 8, in the vibration isolator constructed as described above, a fitted portion 72 of a support metal member 71 having the same structure as the above support metal member 30 is forced into an axial hole 61a of the inner cylindrical metal member 61 over the entire length thereof, and thereby, the intermediate portion 63 of the inner cylindrical metal member 61 is enlarged toward a radial direction in its diameter, and thus, the fitted portion 72 is firmly fitted and fixed to the inner cylindrical metal member 61. In this case, both end sides of the inner cylindrical metal member 61 including a locating portion of the stopper member 65;65 are formed into the large-diameter portion 62;62 which is slightly larger than the inner and outer diameters of the intermediate portion 63 held between the both end sides. Therefore, when the support metal member 71 is forced into the axial hole 61a of the inner cylindrical metal member 61, only intermediate portion 63 is elastically deformed by an influence of the force fit, and then, is enlarged in its diameter, and thus, a slight clearance is formed between the inner periphery of the large-diameter portion 62;62 and the outer periphery of the fitted portion 72 of the support metal member 71. As a result, the stopper member 65;65 made of a resin does not receive an outward force in a radial direction; therefore, it is possible to secure a strength of the stopper member 65 for a long period without lowering it. Moreover, the support metal member 71 receives an elastic reaction force from the intermediate portion 63 of the inner cylindrical metal member 61; therefore, it is possible to properly secure a drawing force equivalent to the press-fit force without lowering it.

Attachment to a vehicle of the vibration isolator, into which the support metal member 71 is forced, is the same as the case of the vibration isolator shown in the above embodiment. Moreover, the vibration isolator is attached to the vehicle, and thereby, the same vibration damping and support effect as the above embodiment is obtained. Moreover, a durability of the stopper member 65;65 is secured without lowering the strength thereof by forcing the support metal member 71 into the inner cylindrical metal member 61; therefore, it is possible to securely suppress a vibration by an excessive vibration input for a long period.

In the above another embodiment, the stopper member 65 has a ring shape located over the entire circumference of the inner cylindrical metal member 61, and also, the recess portion 69 of the rubber elastic member 68 is formed like a ring over the entire circumference correspondingly to the stopper member 65, and thereby, the vibration isolator can exhibit the same vibration isolating performance at any portions of the circumferential direction. Therefore, the vibration isolator is attached to the support metal member 71 regardless of its direction, so that a work for attaching the vibration isolator can be readily performed. However, the stopper member may be projected into a specific direction, and a recess portion may be provided in only rubber elastic member corresponding to the projecting direction. As a result, a vibration damping direction is controlled to a fixed direction. Moreover, in the case where the stopper member may be made of metal in place of a resin, the same effect as the above embodiment can be obtained.

The above embodiments have explained about the case where the vibration isolator is used as a differential mount. The present invention is not limited to the above embodiments, and is applicable to other similar cases. Moreover, the vibration isolator is used as a differential mount, and thereby, the support metal member for cantilever support has been used. A structure may be employed such that the support metal member is supported at both ends. In addition, the above embodiments show one example of the vibration isolator, and various modifications may be carried out within the scope without diverging from the gist of the present invention.

What is claimed is:

1. A vibration isolator comprising:
    an inner cylindrical metal member having an axially extending hole, said inner cylindrical metal member having an axial first portion which is coaxially bulged radially outward with respect to an axial second portion of said inner cylindrical metal member in such a manner that said first portion serves as a cylindrical large-diameter portion extending parallel to an axis of said inner cylindrical metal member and having inner and outer diameters which are respectively larger than inner and outer diameters of said second portion;
    a ring-shaped stopper member made of one of a resin and a metal and fixed directly on an outer peripheral surface of said cylindrical large-diameter portion and projecting radially outward;
    an outer cylindrical metal member arranged outside said inner cylindrical metal member and said stopper member in a radial direction thereof;
    a rubber elastic member interposed between said inner cylindrical metal member and said outer cylindrical metal member to elastically connect said inner cylindrical metal member with said outer cylindrical metal member; and
    a metal support member press-fitted into the axially extending hole of said inner cylindrical metal member, wherein
        said cylindrical large-diameter portion of said inner cylindrical metal member is not contacting said support member being positioned in said axially extending hole of said inner cylindrical metal member, and an inner surface portion between said first and second portions of said inner cylindrical metal member forms a boundary of said axially extending hole.

2. A vibration isolator comprising:
    an inner cylindrical metal member having an axially extending hole, said inner cylindrical metal member formed such that an axial intermediate portion of said inner cylindrical metal member is coaxially bulged radially outward with respect to an axial first portion and second portion in such a manner that said intermediate portion serves as a cylindrical large-diameter portion extending parallel to an axis of said inner cylindrical metal member, said intermediate portion having said cylindrical large-diameter portion with inner and outer diameters which are respectively larger than inner and outer diameters of said first and second portions;

a ring-shaped stopper member made of one of a resin and a metal and fixed directly on an outer peripheral surface of said cylindrical large-diameter portion and projecting radially outward;

an outer cylindrical metal member arranged outside said inner cylindrical metal member and said stopper member in a radial direction thereof;

a rubber elastic member interposed between said inner cylindrical metal member and said outer cylindrical metal member to elastically connect said inner cylindrical metal member with said outer cylindrical metal member, and a metal support member press-fitted into the axially extending hole of said inner cylindrical metal member, wherein said cylindrical large-diameter portion of said inner cylindrical metal member is not contacting said support member being positioned in said axially extending hole of said inner cylindrical metal member, and both inner surface portions between said intermediate portion and said first and second portions of said inner cylindrical metal member form boundaries of said axially extending hole.

3. A vibration isolator comprising:

an inner cylindrical metal member having an axially extending hole, said inner cylindrical metal member formed such that an axial first portion and an axial second portion of said inner cylindrical metal member are coaxially bulged radially outward with respect to an intermediate portion between said axial first portion and said axial second portion in such a manner that said first and second portions serve as cylindrical large-diameter portions extending parallel to an axis of said inner cylindrical metal member, said first and second portions having said cylindrical large-diameter portions with inner and outer diameters which are respectively larger than inner and outer diameters of said intermediate portion;

a pair of ring-shaped stopper members made of one of a resin and a metal and fixed directly on outer peripheral surfaces of said cylindrical large-diameter portions and projecting radially outward;

an outer cylindrical metal member arranged outside said inner cylindrical metal member and said pair of stopper members in a radial direction thereof;

a rubber elastic member interposed between said inner cylindrical metal member and said outer cylindrical metal member to elastically connect said inner cylindrical metal member with said outer cylindrical metal member, and a metal support member press-fitted into the axially extending hole of said inner cylindrical metal member, wherein said cylindrical large-diameter portions of said inner cylindrical metal member are not contacting said support member being positioned in said axially extending hole of said inner cylindrical metal member, and both inner surface portions between said intermediate portion and said first and second portions of said inner cylindrical metal member form boundaries of said axially extending hole.

4. The vibration isolator according to claim 1, wherein a stepped portion between said large-diameter portion of said inner cylindrical metal member and said second portion thereof has an inclined surface.

5. The vibration isolator according to claim 1, wherein a force-fit allowance of said metal support member and said inner cylindrical metal member is in a range from 0.05 to 0.5 mm in a diametrical dimension.

6. The vibration isolator according to claim 2, wherein stepped portions between said large-diameter portion of said inner cylindrical metal member and said first and second portions thereof have inclined surfaces;

a force-fit allowance of said metal support member and said inner cylindrical metal member is in a range from 0.05 to 0.5 mm in a diametrical dimension.

7. The vibration isolator according to claim 3, wherein stepped portions between said large-diameter portions of said inner cylindrical metal member and said intermediate portion thereof have inclined surfaces;

a force-fit allowance of said support metal member and said inner cylindrical metal member is in a range from 0.05 to 0.5 mm in diametrical dimension.

* * * * *